(12) United States Patent
Hideshima

(10) Patent No.: US 8,079,026 B2
(45) Date of Patent: Dec. 13, 2011

(54) JOB DEFINITION VERIFICATION SYSTEM, AND METHOD AND PROGRAM THEREOF

(75) Inventor: Kosuke Hideshima, Tokyo (JP)

(73) Assignee: NEC Corporation, Tokyo (JP)

( * ) Notice: Subject to any disclaimer, the term of this patent is extended or adjusted under 35 U.S.C. 154(b) by 1270 days.

(21) Appl. No.: 11/708,542

(22) Filed: Feb. 21, 2007

(65) Prior Publication Data
US 2007/0208781 A1 Sep. 6, 2007

(30) Foreign Application Priority Data
Feb. 22, 2006 (JP) .................. 2006-045939

(51) Int. Cl.
G06F 9/44 (2006.01)
G06F 9/445 (2006.01)
(52) U.S. Cl. .................. 717/168; 717/124; 717/126
(58) Field of Classification Search .................. None
See application file for complete search history.

(56) References Cited

U.S. PATENT DOCUMENTS
2006/0089912 A1* 4/2006 Spagna et al. .................. 705/51

FOREIGN PATENT DOCUMENTS
| JP | 6-214807 A | 8/1994 |
|---|---|---|
| JP | 10-187611 | 7/1998 |
| JP | 2003-30008 A | 1/2003 |
| JP | 2004-86691 A | 3/2004 |
| JP | 2005-196334 A | 7/2005 |
| JP | 2005-242848 A | 9/2005 |

* cited by examiner

Primary Examiner — Chuck Kendall
(74) Attorney, Agent, or Firm — Foley & Lardner LLP

(57) ABSTRACT

The job definition verification system includes an approval information storage unit for storing approval information to the effect that execution is allowed which is obtained by an approver as to difference information obtained by update of at least one of job definition information related to information about a job to be executed, job dependency information and schedule information which are stored in a data base, and a job execution unit for executing job information of the data base only when the job information is approved based on the approval information.

6 Claims, 6 Drawing Sheets

ABSTRACT

JOB DEFINITION VERIFICATION SYSTEM, AND METHOD AND PROGRAM THEREOF

BACKGROUND OF THE INVENTION

1. Field of the Invention

The present invention relates to a technique which enables job execution by automatically detecting update of a job definition and verifying and approving update contents.

2. Description of the Related Art

Today, various systems cooperate with each other and job definition information has been more complicated and upgraded. In addition, in job control, an error largely affects a system.

In large-scale job flow processing, it is laborious to detect a definition update and comprehend effects exerted by update contents.

Under these circumstances, proposed is a technique (see e.g. Patent Literature 1) of solving the problem, by the provision, in a job schedule alteration processing method by a computer, of a job schedule information storage unit for storing applied job schedule information, an alteration information storage unit for storing job schedule altering time and alteration contents, and a time check unit for checking an altering time at the execution of a job and when it is the relevant altering time, executing a job schedule based on the alteration contents, that in the job schedule alteration processing method by a computer, when after the processing is all completed, alteration work or restoration work is to be executed with even an altering time determined in advance, the work should be executed within limited occasion and time to have extremely heavy work loads.

Patent Literature 1: Japanese Patent Laying-Open No. 10-187611

The above-described conventional example, however, has the following problems.

With a large-scale job management system, definition information structure management is difficult and verification of definition information is laborious.

It is not rare that a job is executed with inconsistency existing without noticing update of definition information, so that an error is detected after the execution to cause a system failure.

SUMMARY OF THE INVENTION

An object of the present invention, which is proposed in consideration of the circumstances described in the foregoing, is to provide a job definition verification system, a job definition verification method and a program thereof which facilitate verification of update information and prevent a system failure beforehand by preventing execution of a job whose effect exerted on a system is yet to be verified.

According to the present invention, update information can be verified with ease, while execution of a job which is yet to be verified by approval proceeding can be prevented.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

In the following, a first embodiment of the present invention will be described in detail with reference to the drawings.

Figure 1:
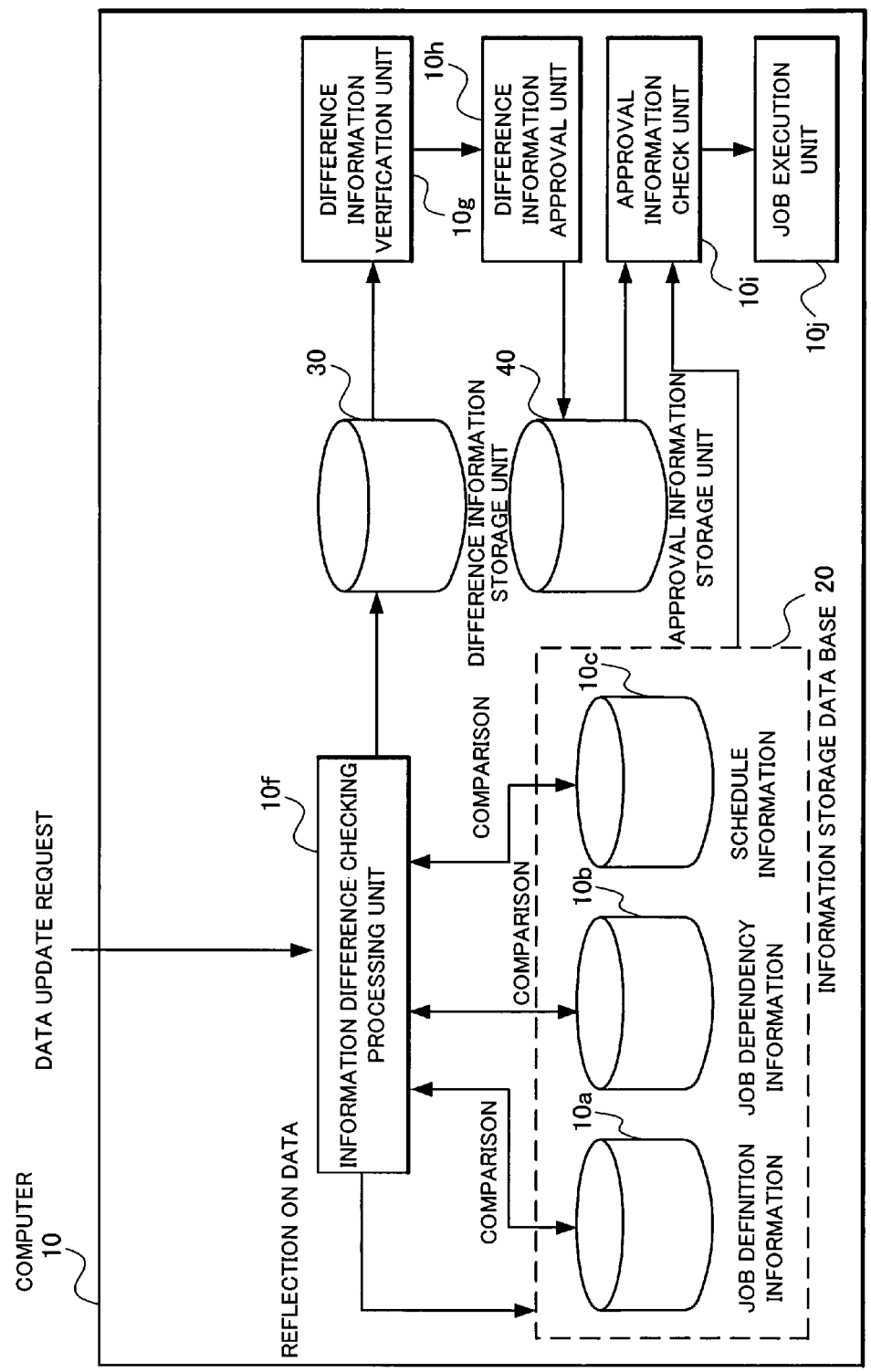
FIG. 1 is a diagram showing a structure of a job definition verification system according to a first embodiment of the present invention.

With reference to FIG. 1, a job definition verification system 10 according to the present embodiment, which is a computer 10 operable under the control of a program, includes an information storage data base 20 which stores job definition information 10a in which a job to be executed is described, job dependency information 10b necessary for flow control and schedule information 10c in which time and date when execution is to be made is described, a difference information storage unit 30 which stores difference information 10d, an approval information storage unit 40 which stores approval information 10e, an information difference checking processing unit 10f, a difference verification unit 10g, a difference information approval unit 10h, an approval information check unit 10i and a job execution unit 10j.

These information difference checking processing unit 10f through the job execution unit 10j operate in a manner described below.

The information difference checking processing unit 10f compares update information whose update is requested and the job definition information 10a, the job dependency information 10b and the schedule information 10c on the information storage data base 20 to extract difference information 10d. The difference information verification unit 10g presents verification items based on the difference information 10d on the predetermined display device (not shown) connected to the computer 10, which is stored in approval information 10e by the difference information approval unit 10h.

The approval information check unit 10i verifies existence/non-existence of approval based on the approval information 10e and the job execution unit 10j executes a job.

With reference to FIG. 1, operation of the job definition verification system 10 according to the present embodiment will be described in detail.

Figure 2:
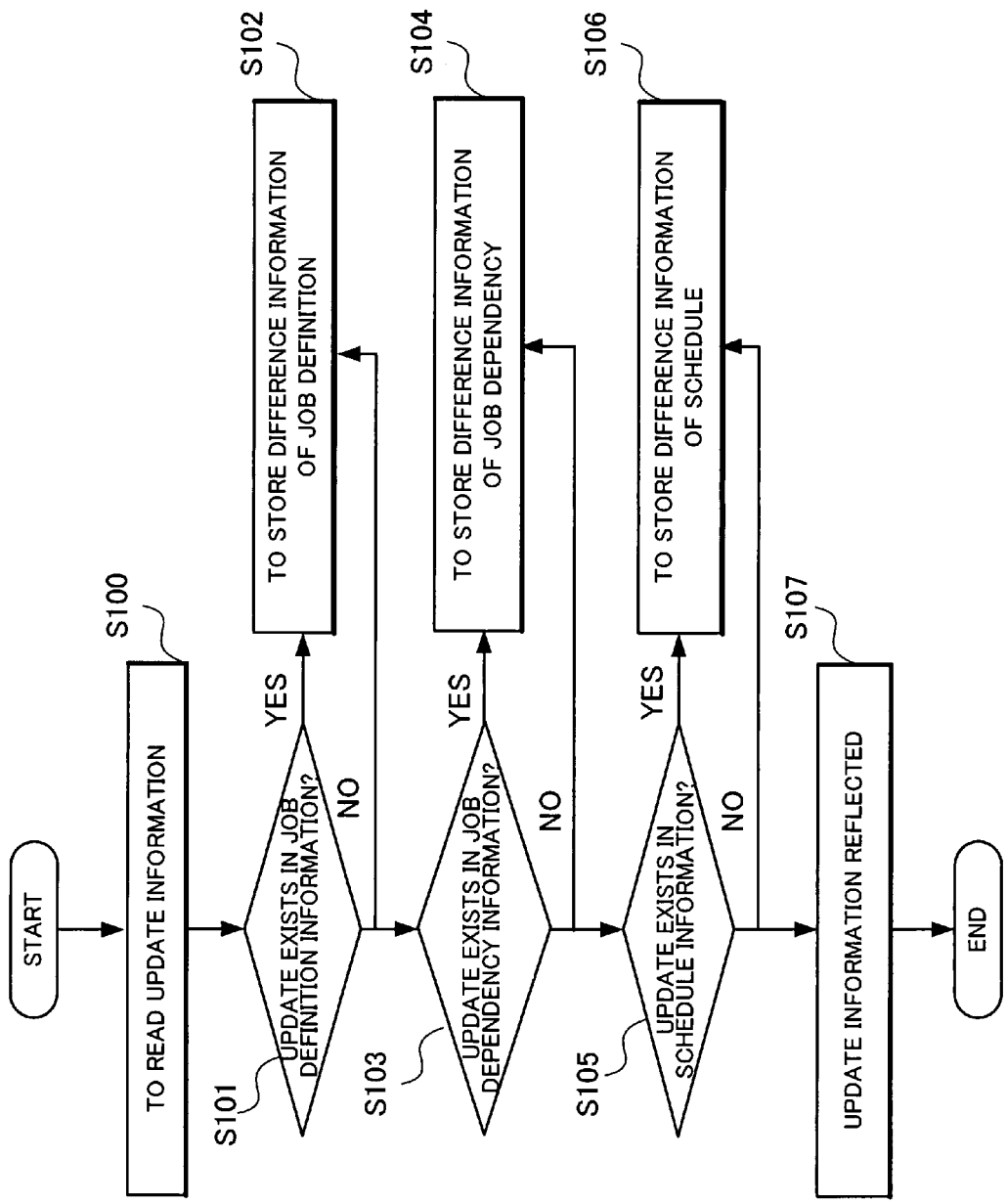
FIG. 2 is a flow chart showing operation of processing information executed at a difference check unit in the first embodiment of the present invention.

First, description will be made of operation of processing information which is executed by the difference check unit 10f with reference to FIG. 2. When a data update request is transmitted, read the data (update information) (Step S100 in FIG. 2). Next, check the update information and the job definition information 10a stored in the information storage data base 20 to see whether update exists or not (Step S101).

When update exists related to the job definition information 10a, store the difference information 10d of a job definition in the difference information storage unit 30 (Step S102).

Subsequently, check the update information and the job dependency information lob stored in the information storage data base 20 to see whether update exists or not (Step S103).

When update exists related to the job dependency information 10b, store the difference information 10d of a job dependency in the difference information storage unit 30 (Step S104).

Subsequently, check the update information and the schedule information 10c stored in the information storage data base 20 to see whether there exists update (Step S105).

When update exists related to the schedule information 10c, store the difference information 10d of a schedule in the difference information storage unit 30 (Step S106).

Lastly, store the difference information 10d in the job definition information 10a, the job dependency information 10b and the schedule information 10c of the information storage data base 20 to reflect update information thereon (Step S107).

Figure 3:
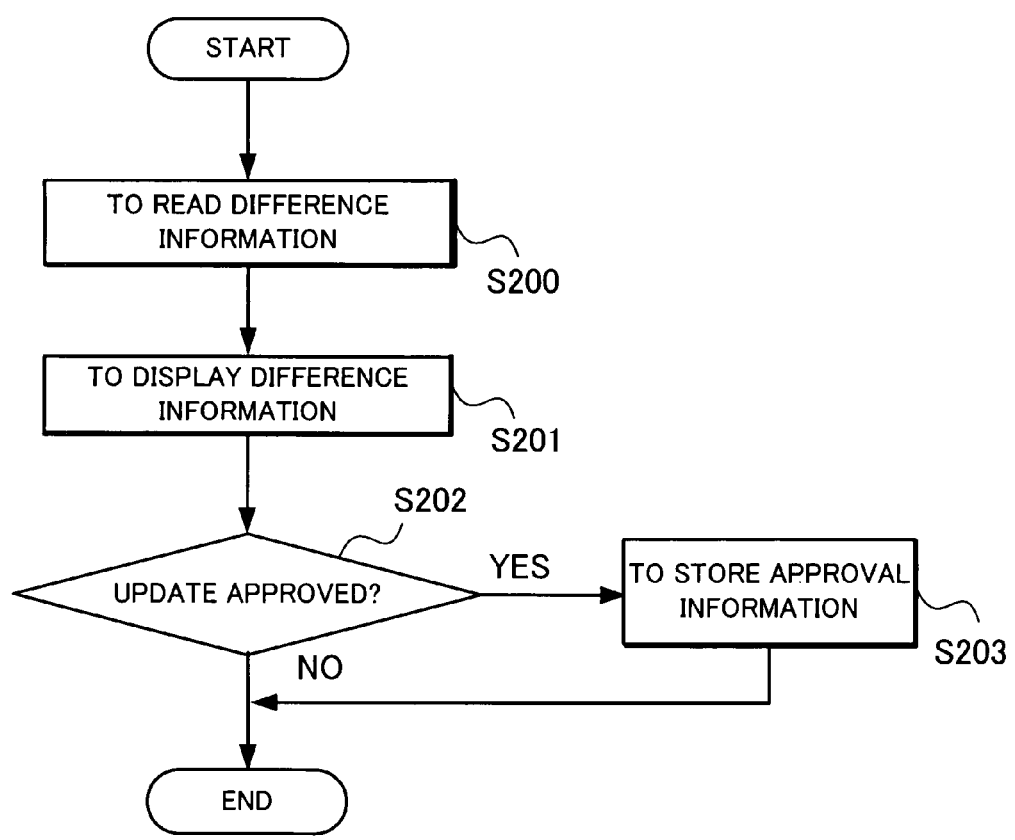
FIG. 3 is a flow chart showing operation of processing difference information executed at a verification unit and an approval unit in the first embodiment of the present invention.

Next, description will be made of processing operation of the difference information verification unit 10g and the difference information approval unit 10h with reference to FIG. 3.

First, the difference information verification unit log reads the difference information 10d of the difference information storage unit 30 (Step S200), and presents the read difference information 10d on the predetermined display device (Step S201).

In the difference information 10d presented, an alteration point and alteration contents of a dependency based on dependency information are included.

Figure 4:
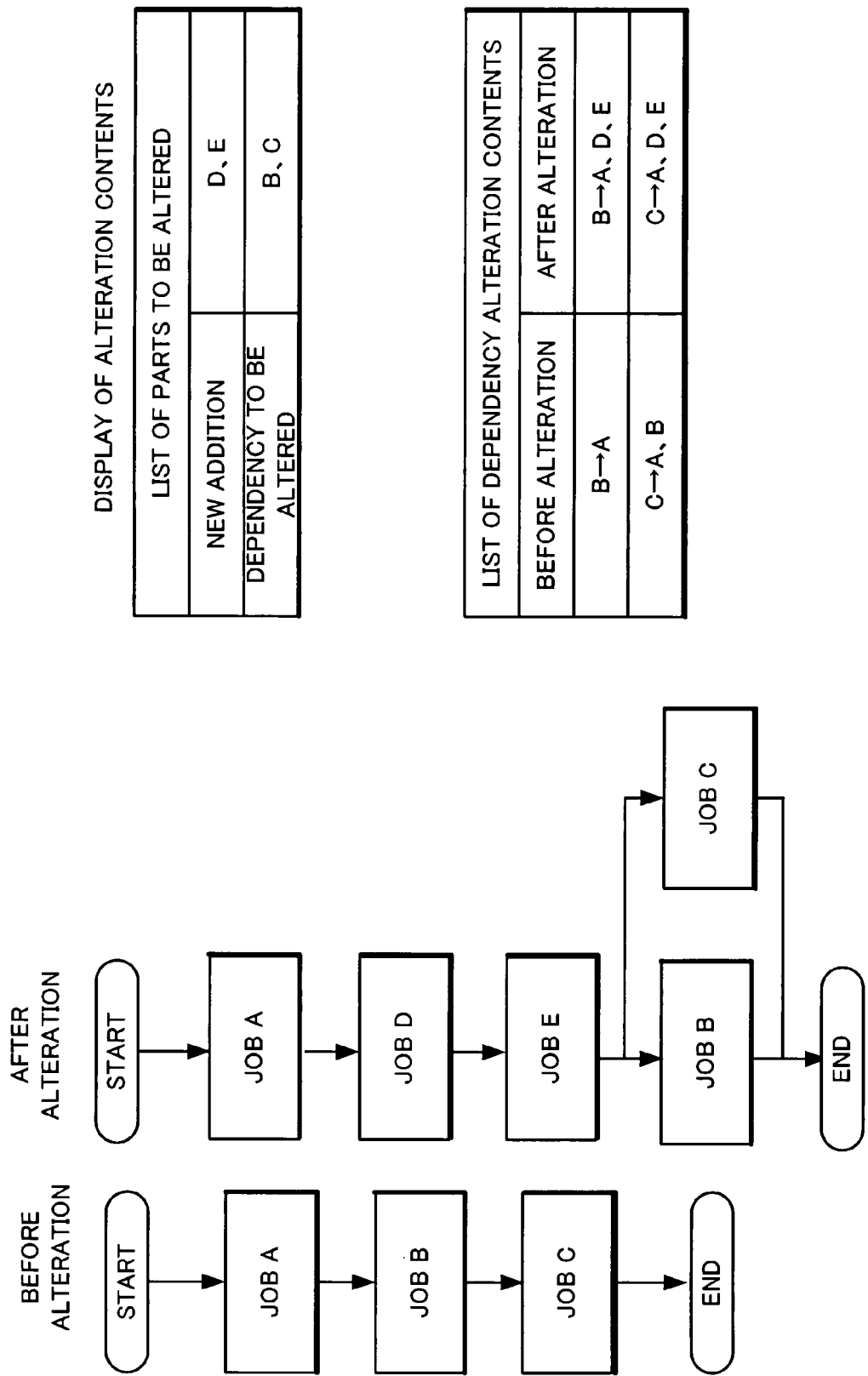
FIG. 4 is a diagram showing an update example and a present example of difference information in this case in the first embodiment of the present invention.

FIG. 4 shows an update example of a job definition and a present example of difference information in that case. In the example of FIG. 4, jobs D and E are added and a job flow of a job C is altered. Presented is alteration contents of dependency of the job B as a result of insertion of two parts (the job D and the job E) preceding to the job B. As to the job C, it is altered to be executed in parallel to the job B with two parts added preceding thereto, contents of which are presented.

A system manager determines whether to approve based on the presented update information (Step S202) and when approving, the approval information 10e is stored in the approval information storage unit 40 by the difference information approval unit 10h (Step S203).

Figure 5:
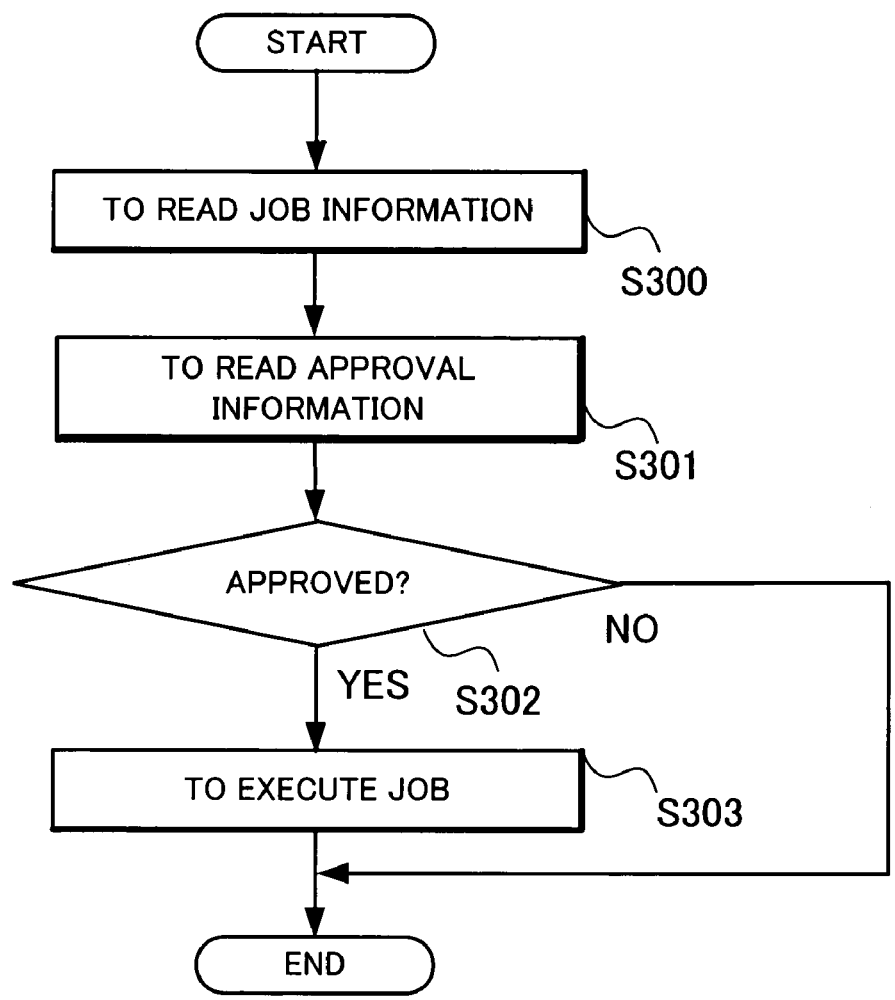
FIG. 5 is flow chart showing a flow of job execution based on approval information in the first embodiment of the present invention.

Lastly, description will be made of a flow of job execution based on the approval information 10e with reference to FIG. 5.

First, read job information from the information storage data base 20 (Step S300) and thereafter read the approval information 10e from the approval information storage unit 40 (Step S301).

By the approval information check unit 10i, see whether the read job information is approved or not based on the approval information 10e (Step S302) and when the information is approved, execute a job by the job execution unit 10j (Step S303).

The present embodiment described above enables verification of update information with ease. The reason is that automatic extraction of a dependency in update information and presenting of a list of additional contents of a job enables a range of effects to be verified with ease.

In addition, approval processing enables execution of a job yet to be verified to be prevented. More specifically, as to job information which fails to store the approval information 10e, its approval is not verified and therefore the job is not executed by the job execution unit 10j. As a result, prevention of execution of a job whose effect exerted on the system is yet to be verified leads to prevention of a system failure beforehand.

Next, description will be made of the job definition verification system 10 according to a second embodiment of the present invention. While in the above-described first embodiment, storage of the difference information 10d and approval based on the storage contents are executed, application also to internal regulation and management of a job management system is enabled by storing information update• creator information and approver information as user information.

Figure 6:
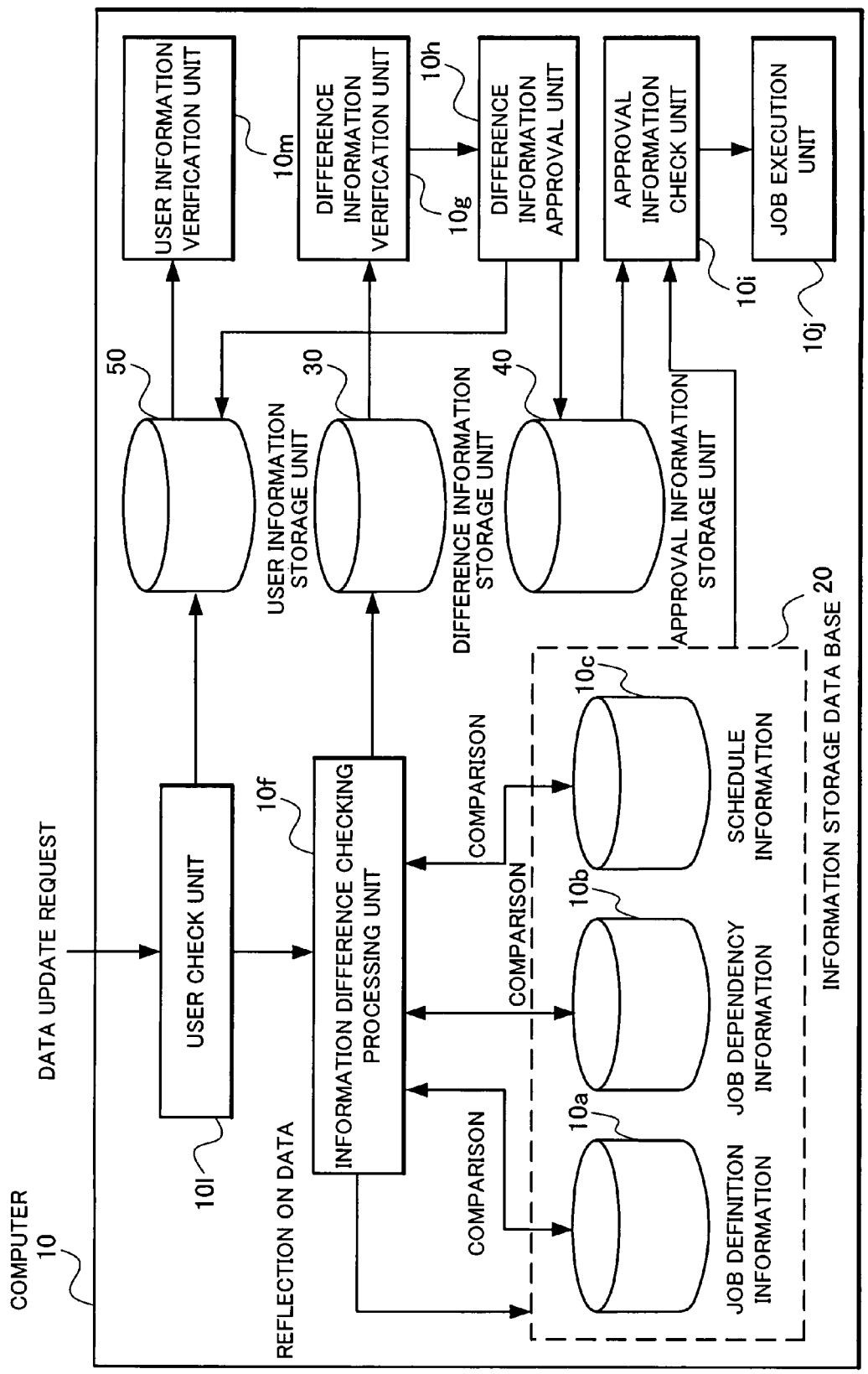
FIG. 6 is a diagram showing a structure of a job definition verification system according to a second embodiment of the present invention.

In other words, with reference to FIG. 6, a user information storage unit 50 for storing user information 10k is added to store update• creator information and approver information as user information.

Upon a data update request, the newly added user check unit 101 stores, from update information, update• creator information as user information in the user information storage unit 50. The difference information approval unit 10h has an additional function of storing information about an approver who executes approval of difference information as user information in the user information storage unit 50.

The user information (information about update• creator and information about an approver) stored in the user information storage unit 50 allows who executes the relevant work (information update• generation and approval of difference) at which time by means of the user information verification unit 10m to be found. This enables internal regulation and management of a job management system.

The above-described respective embodiments are preferred embodiments of the present invention and can be implemented in various modifications without departing from the gist of the present invention. Processing of realizing the functions of the computer 10 may be executed, for example, by reading a program for realizing the functions of the computer 10 in the above-described embodiments by the computer 10 and executing the same. Furthermore, the program may be transmitted to other computer system by transmission waves through a CD-ROM or a photo-electro-magnetic disk as a computer-readable recording medium or through the Internet or a telephone line as a transmission medium.

While the above-described respective embodiments have been described with respect to a system structure in which each function of job definition verification is realized as one computer system, it is apparent that the above embodiments are applicable also to a structure in which a plurality of devices are added for each function.

The present invention is applicable for such use as definition information release from evaluation environment to real environment in a batch job system. In addition, who alters or approves is made clear to enable application to management of internal regulation.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A job definition verification system, comprising:
    an approval information storage unit which stores approval information to the effect that execution is allowed which is obtained by an approver as to difference information obtained by an update of at least one of job definition information related to information about a job to be executed, job dependency information and schedule information which are stored in a data base;
    a job execution unit which executes job information of said data base only when said job information is approved based on said approval information;
    a difference check unit which checks whether there exists the update of said job definition information, job dependency information and schedule information;
    a difference information storage unit which stores difference information when the update exists;
    a difference information verification unit which presents difference information stored in said difference information storage unit so as to be verified; and
    an approval information check unit which checks whether job information in said data base is approved or not based on said approval information.

2. The job definition verification system according to claim 1, wherein,
    when at least one of said job definition information, job dependency information and schedule information is updated, said difference information, information update creator information and information about an approver who approves said difference information are stored as user information.

3. A job definition verification method, comprising the steps:
    storing approval information in an approval information storage unit to the effect that execution is allowed which is obtained by an approver as to difference information obtained by an update of at least one of job definition information related to information about a job to be executed, job dependency information and schedule information which are stored in a data base;
    executing job information of said data base only when said job information is approved based on said approval information;
    checking whether there exists an update of said job definition information, job dependency information and schedule information;
    storing difference information in a difference information storage unit when the update exists;
    presenting the difference information stored in said difference information storage unit so as to be verified; and
    checking whether job information in said data base is approved or not based on said approval information.

4. The job definition verification method according to claim 3, further comprising the step of
    storing, when at least one of said job definition information, job dependency information and schedule information is updated, said difference information, information update creator information and information about an approver who approves said difference information as user information.

5. A program executed on a computer for executing processing in a job definition verification system, comprising the functions of:
    storing approval information in an approval information storage unit to the effect that execution is allowed which is obtained by an approver as to difference information obtained by update of at least one of job definition information related to information about a job to be executed, job dependency information and schedule information which are stored in a data base;
    executing job information of said data base only when said job information is approved based on said approval information;
    checking whether there exists an update of said job definition information, job dependency information and schedule information;
    storing difference information in a difference information storage unit when the update exists;
    presenting the difference information stored in said difference information storage unit so as to be verified; and
    checking whether job information in said data base is approved or not based on said approval information.

6. The program according to claim 5, further comprising the function of
    storing, when at least one of said job definition information, job dependency information and schedule information is updated, said difference information, information update creator information and information about an approver who approves said difference information as user information.

* * * * *